United States Patent [19]

Shinler

[11] Patent Number: 5,317,961
[45] Date of Patent: Jun. 7, 1994

[54] ROLL-UP CAMPFIRE COOKING GRILL

[75] Inventor: LeRoy J. Shinler, Rush City, Minn.

[73] Assignee: William A. Braddock, Minneapolis, Minn. ; a part interest

[21] Appl. No.: 112,614

[22] Filed: Aug. 26, 1993

[51] Int. Cl.⁵ .......................... A47J 33/00; A47J 37/07
[52] U.S. Cl. ......................................... 99/449; 99/450; 126/9 R; 126/9 B; 126/25 R
[58] Field of Search .................. 99/339, 340, 449, 450, 99/448, 421 R, 419; 126/9 R, 9 A, 9 B, 25 R, 25 A, 29, 30; 211/181, 182, 175; 108/111–113

[56] References Cited

U.S. PATENT DOCUMENTS

| | | | |
|---|---|---|---|
| 718,714 | 1/1903 | Larson | 99/449 X |
| 1,473,056 | 11/1923 | Steen | 126/9 B |
| 3,537,388 | 11/1970 | Martin | 126/9 R |
| 3,785,360 | 1/1974 | Martin | 126/30 |
| 3,828,759 | 8/1974 | Cooper | 126/25 R |
| 4,120,279 | 10/1978 | White | 99/340 |
| 4,178,844 | 12/1979 | Ward et al. | 211/175 X |
| 4,191,160 | 3/1980 | Elliott | 126/9 R |
| 4,589,399 | 5/1986 | Hamill et al. | 126/30 |
| 4,724,753 | 2/1988 | Neyman et al. | 99/339 |
| 4,977,824 | 12/1990 | Shinler | 99/449 |

Primary Examiner—Timothy F. Simone
Attorney, Agent, or Firm—Burd, Bartz & Gutenkauf

[57] ABSTRACT

A roll-up portable table or cooking grill which presents, when in an open first condition for use, a relatively flat, substantially rectangular, upwardly facing table adapted to be supported to define a generally horizontal rigid cooking surface. When in a rolled up second condition for transport or storage, the table is configured to be contained within a generally cylindrical container. The portable table or grill includes a plurality of bars, each having a straight, stiff, longitudinally extending, central rod spaced from and mutually parallel with respect to every other central rod; and two generally J-shaped hook portions, one at each end of that rod. The J-shaped hook portions of each bar each include a shank, a first end of which extends integrally from one end of the rod. These hook portions each include a hook which extends integrally from a second end of the shank. The shanks of the hook portions of each bar extend away from the rod in generally congruent relation to each other while converging slightly toward each other. The hooks of each bar extend from integral connection with their shanks diametrically away from each other and in concentric alignment with each other to lie in parallel relation to the rod of that bar. The bars are so configured that they can be assembled together so as to have both shanks of a leading bar extend under the rod of the next adjacent trailing bar and have both hooks of that leading bar extend outwardly over and above the shanks of that trailing bar.

19 Claims, 3 Drawing Sheets

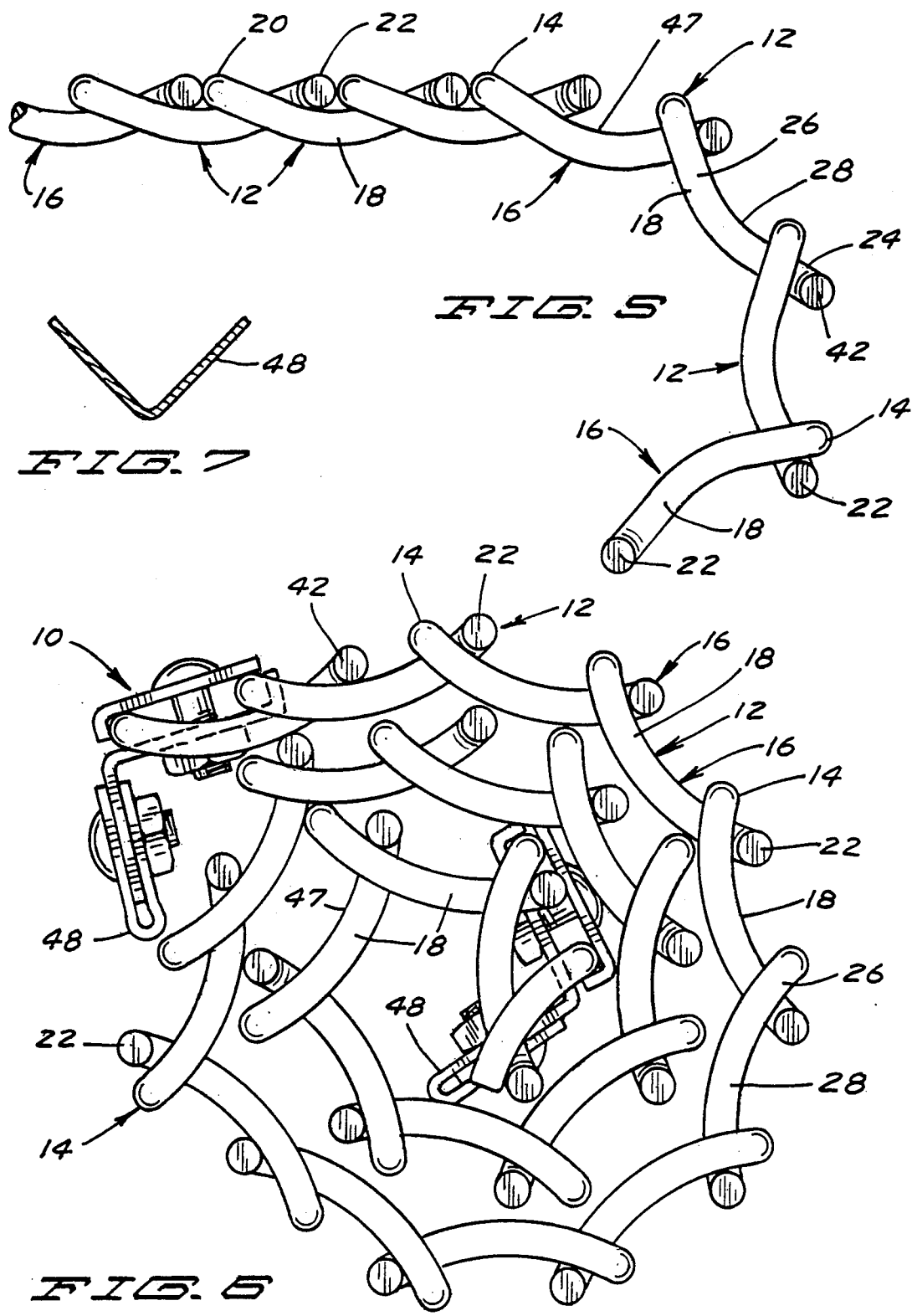

ROLL-UP CAMPFIRE COOKING GRILL

BACKGROUND OF THE INVENTION

1. Field of the Invention

This invention relates to portable campfire cooking grills of the type in which a plurality of parallel, spaced apart rods are positioned over a ground-supported campfire or bed of charcoal to broil, boil, fry or otherwise prepare food in an "away-from-home" situation, where such cooking grills must be carried to and from the cooking site whether cleaned or uncleaned, stowed in vehicles and/or backpacked for transport to or from the campsite/-cooking site, and stored at the "home base" between uses.

2. The Prior Art

This invention is an improvement on the inventions of my U.S. Pat. No. 4,977,824, granted Dec. 18, 1990. That patent and all of the references cited therein are incorporated into this disclose by this reference. The inventions disclosed and covered by my earlier patent have proved to be very effective for their intended purposes. A major improvement in this present invention over my earlier inventions is in the development of simplified structures which can be manufactured much more inexpensively, and, therefore, can be sold at a price which will make the grill successful in the marketplace. In addition, all of the advantages of the inventions set forth in my patent are also present in this present invention.

SUMMARY OF THE INVENTION

A roll-up portable table or cooking grill presents, when in an open first condition for use, a relatively flat, substantially rectangular, upwardly facing table adapted to be supported to define a generally horizontal rigid surface. When in a rolled up second condition for transport or storage, the table is configured to be circumscribed by a generally cylindrical container.

The portable table or grill includes a plurality of bars, each bar having: (1) a straight, stiff, longitudinally extending, central rod spaced from and mutually parallel with respect to every other central rod; and (2) two generally J-shape hook portions, one at each end of that rod. The J-shape hook portions of each bar each include a shank, a first end of which extends integrally from one end of the rod. These hook portions each include a hook which extends integrally from a second end of the shank. The shanks of the hook portions of each bar extend away from the rod in generally congruent relation to each other while converging slightly toward each other. The hooks of each bar extend from integral connection with their shanks diametrically away from each other and in concentric alinement with each other to lie in parallel relation to the rod of that bar.

The bars are so configured that they can be assembled together so as to have both shanks of a leading bar extend under the rod of the next adjacent trailing bar and to have both hooks of that leading bar extend outwardly over and above the shanks of that trailing bar. One such configuration is described herein without limitation to the broad concept of the invention.

BRIEF DESCRIPTION OF THE DRAWINGS

The invention is illustrated by the accompanying drawings in which corresponding parts are identified by the same numerals and in which:

FIG. 5 is a fragmentary side elevation view of the bars of the invention showing the relative movement of the bars with respect to each other as they move progressively from their open, flat horizontal first condition (as seen at a left end portion of FIG. 5) and toward a rolled up second condition (as seen toward the right end of FIG. 5);

FIG. 6 is an enlarged end view of the cooking grill of FIG. 1 but in its rolled up second condition configured to be circumscribed by a cylindrical container for transport or storage; and FIG. 7 is an enlarged sectional view taken of the line 7—7 in FIG. 1.

DETAILED DESCRIPTION OF THE PREFERRED EMBODIMENTS

Figure 1:
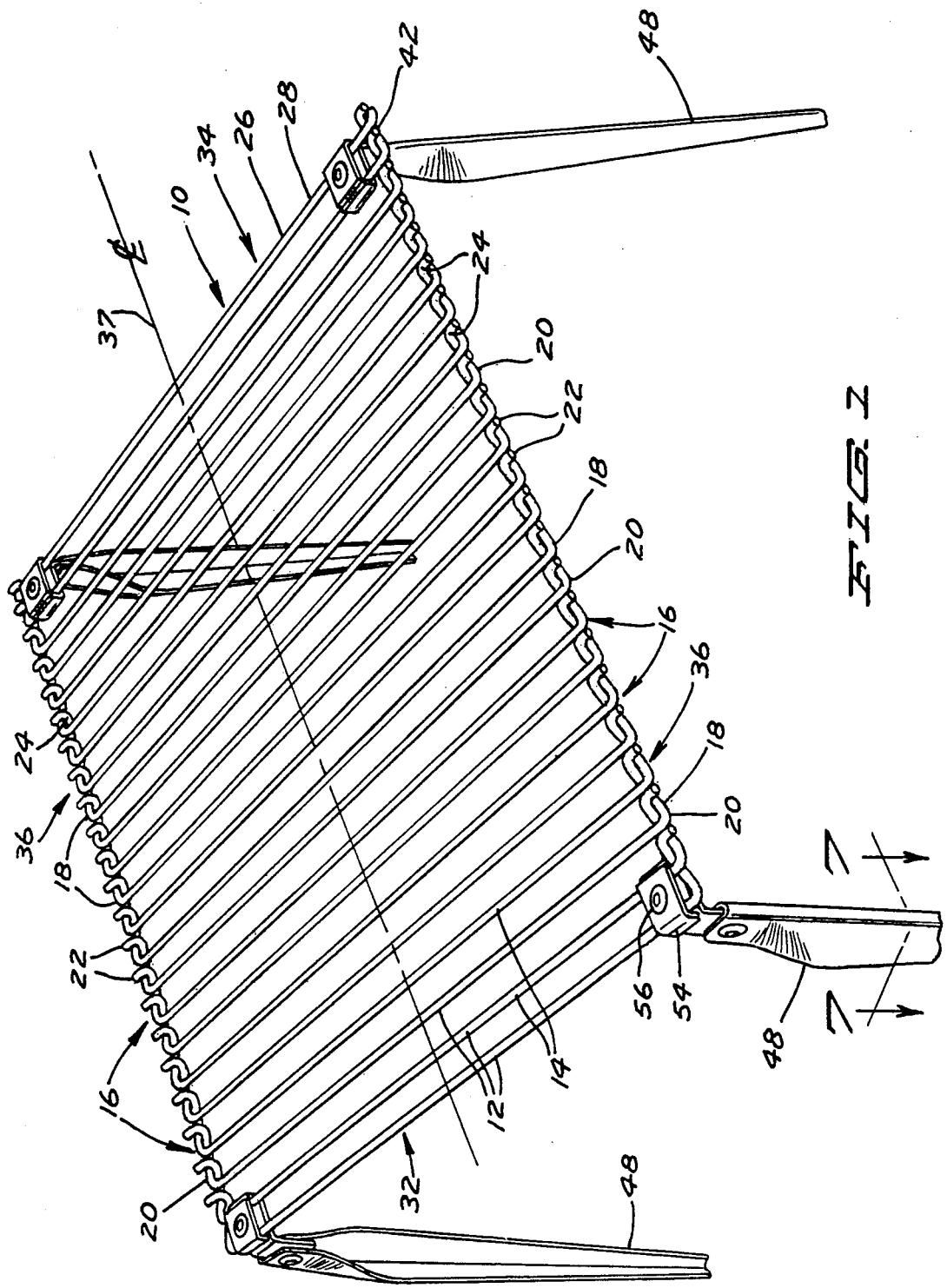
FIG. 1 is a perspective view of a roll-up cooking grill and portable table of the present invention in an open first condition ready for use in a first preferred form of the invention.

A relatively flat, substantially rectangular, upwardly facing roll-up cooking grill or table 10 includes a plurality of bars 12. Each bar includes a straight, relatively stiff, somewhat flexible, longitudinally extending central rod 14, and two generally J-shape hook portions 16, 16, one at each end of each rod. Each J-shape hook portion 16 includes a shank 18 which extends integrally from one end of its rod 14, as at 20, and generally perpendicular to the rod, but converging slightly toward one another, as described hereinafter. Each hook portion 16 also includes a hook 22 which extends integrally from a second end of shank 18 as at 24. Hooks 22 extend outwardly from rod 14 generally at right angles to shanks 18.

In the form of the invention illustrated herein, each of the bars 12 is fabricated from a single piece of relatively stiff, elongate material 26 of a predetermined uniform thickness and having a high resistance to deformation when heated. This elongate material can be square, rectangular or triangular in transverse cross section, but is shown herein, in a preferred form, to be a stainless steel wire 28 which is circular in transverse cross section.

In a preferred form, each central rod 14 will include relatively stiff, somewhat flexible, elongate material in integral relation to each shank as shown herein. In other effective forms, middle portions of the rods 14 can have other shapes. For example, the middle portion of at least some of the rods 14 can take the form of the relatively flat slats 60 as seen in FIG. 10 of my U.S. Pat. No. 4,977,842.

Figure 2:
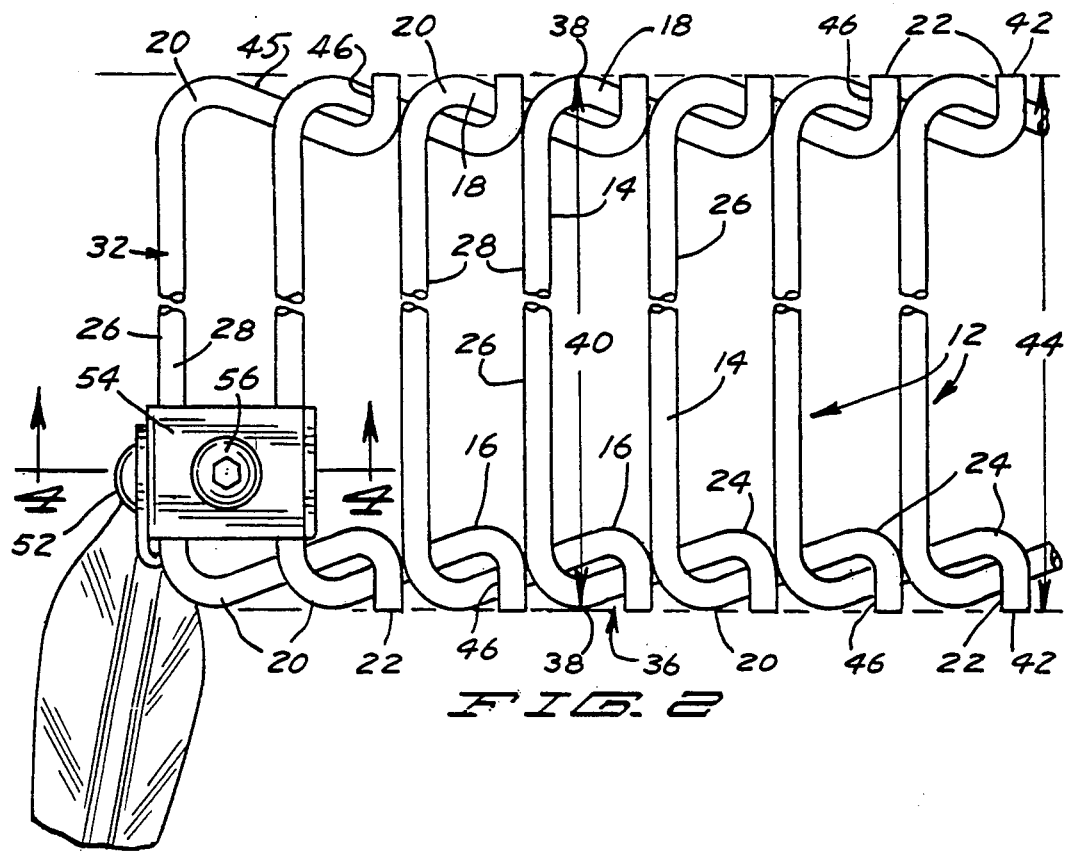
FIG. 2 is a fragmentary, enlarged top plan view showing part of the grill to the left as seen in FIG. 1.
Figure 3:
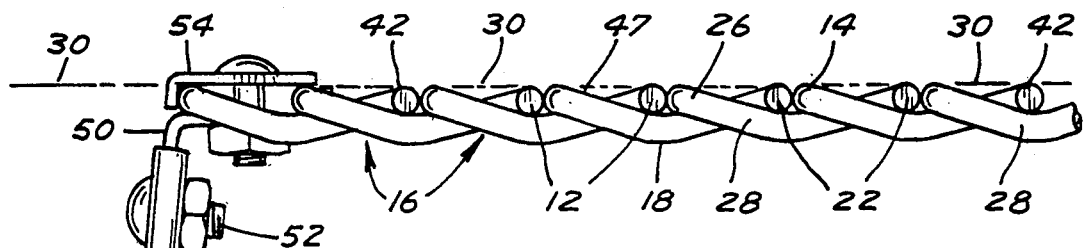
FIG. 3 is a fragmentary side elevation view of the grill as seen in FIG. 2.

For convenience in describing and ease of understanding the three dimensional aspects of the invention, the naming and interrelationships of the parts will be described with respect to an open first condition of the grill as seen in FIGS. 1 through 4 unless the context requires otherwise. A cooking and table surface defined by the top edges of the rods 14 as seen in FIGS. 1, 2 and 3, for example, is an upper cooking grill and table surface 30. See FIG. 3. Reference to the grill, cooking grill, table and cooking table are all to the same entity, with "grill" being the preferred term to cover them all. The short end of this grill 10 to the left in FIG. 1 is the leading end 32 and the opposite end is the trailing end 34. The longer sides of the grill 10, along which the J-shape hook portions are positioned, are the grill sides 36,36.

The shanks 18 of the J-shape hook portions 16 of each bar 12 extend integrally away from rod 14 initially in a plane which includes the rod. These shanks lie in general congruent relation to each other but do converge slightly toward a center line 37 of the grill 10. Upwardly facing edge surfaces of each pair of shanks are concave downwardly as seen in FIGS. 3 through 6 for reasons which will appear below.

The hooks 22 of the J-shape hook portions 16 of each bar 12 extend from their integral connections with shanks 18 diametrically away from each other to be in concentric alinement with each other and to be in parallel, spaced relation to the rod 14 of that bar 12.

The parts are so configured that shanks 18 of each leading bar 12 extend underneath the rod 14 of the next trailing bar and the hooks 22 of that leading bar extend outwardly over and above the shanks of that trailing bar when the grill is in its open, horizontal, first condition.

The outermost side edge surfaces of the two shanks 18 of every bar 10, at a point adjacent the integral connection of the shanks to their rod 14, are identified as the outermost side edge surfaces 38 of the shanks 18. The longitudinal distance between these outermost side edge surfaces 38 is designated as a first major longitudinal dimension 40 of the bar.

The longitudinal distance between outermost side end surfaces 42 of the two hooks 22 of every bar is designated as a second major longitudinal dimension 44 of the bar.

From these outermost side edge surfaces 38 of the shanks, the shanks converge toward each other so that at the shank ends adjacent their hooks are each closer to the center line 37 than their ends adjacent their rod by about twice the predetermined uniform thickness of the elongate material 26, or in the form of the invention shown, by about twice the diameter of the wire 28.

A leading edge surface 46 of each hook open to an outer side edge surface 45 of its shank extends in parallel relation to its rod for approximately twice the wire diameter, in the form of the invention shown.

Figure 4:
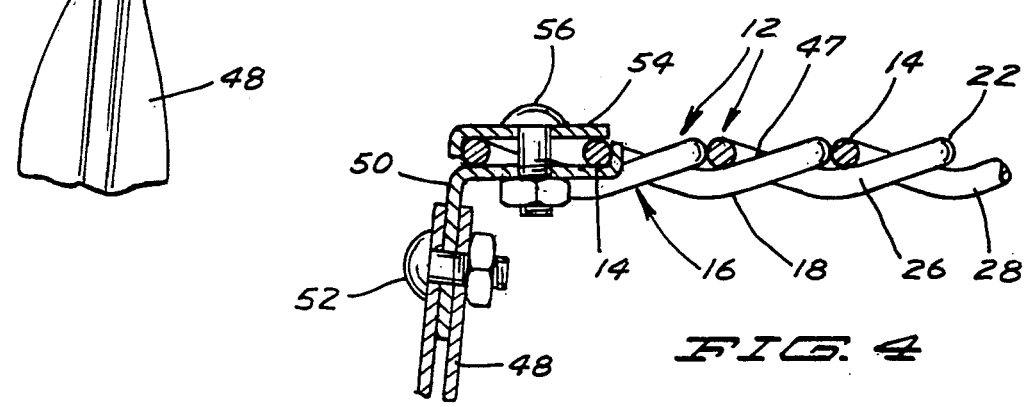
FIG. 4 a fragmentary sectional view taken on the line 4—4 in FIG. 2.

As seen in FIGS. 3 through 6, and as best seen in FIGS. 3 and 4, an upwardly facing surface 47 of each of the shanks 18 is concave downwardly sufficiently that, when the grill in its open first condition, each rod 14 rests on the upwardly facing shank surface 47 of an adjacent leading bar and each hook 22 rests on the upwardly facing shank surface 47 of an adjacent trailing bar with the upwardly facing surfaces of all rods and hooks lying in the upper table surface 30, thereby defining that surface. The depth of each concavity is approximately the thickness of the rod 14.

Each bar 12 is "leading" with respect to the next adjacent bar on one side and at the same time "trailing" with respect to the next adjacent bar on the opposite side, except for the endmost bars. The first bar 12 constituting the leading end 32 of the grill top is "leading" with respect to the next adjacent second bar, which "trailing" with respect to the first bar. That second bar is leading with respect to the next adjacent trailing third bar, and so on until the last bar which constitutes the trailing end 34 of the grill top. Since that last bar has no further bar with respect to which it is leading, the hooks 22 of that last bar may be eliminated, leaving enough of shanks 18 to engage hooks 22 of the preceding next-to-last leading bar.

As illustrated and described, each bar is "trapped" by its leading bar and by its trailing bar. Under normal usage, the grill will stay assembled and none of the bars can "escape". As perhaps best seen in FIG. 2, the shanks of each leading bar fit rather loosely between the shanks of the next trailing bar. The extension of the hooks away from the shanks has been described above as being "approximately twice the wire diameter" of wire 28. To determine the exact needed hook extension, a trailing bar is moved longitudinally with respect to its leading bar as far as possible. This trailing bar is then rotated with respect to its leading bar as far as possible. For example, the last trailing bar to the right in FIGS. 2 and 3 is rotated upwards in the plane of the paper as seen in FIG. 2. This will bring the shanks of the trailing bar into contact with hooks of the leading bar. The upper hook on the leading bar needs only be long enough so that its bottom surface parallel to its rod comes into interfering relation with respect to an uppermost trace of the upwardly facing surface 47 of the trailing shank.

Stated differently, the second major longitudinal dimension 44 of each leading bar can not be substantially less than the first major longitudinal dimension 40 of its immediately adjacent trailing bar if the bars of the grill are to remain "trapped" by each other. Were the second major longitudinal dimension of the bars to be such that either hook side end surface 42 of a bar can pass by a shank 18 of its leading bar, that second major dimension would be substantially less than the first major dimension of the bars.

In this form of the invention, to assemble the bars together initially or to disassemble them should the need arise, advantage is taken of the fact that the rods of the bars are not rigid but are relatively stiff and somewhat flexible. Each leading bar need only be deformed by temporarily bending or bowing the rod to shorten the overall bar length by about the diameter of its wire to allow it to be assembled to, or disassembled from, its trailing bar.

Should it be desired that the grill never come apart, the bars, including their rods, can be made of rigid material which is inflexible and/or the length of the hooks can be increased. Such a permanently assembled structure can be made by forming longer leading hooks out above trailing shanks at the factory, for example.

The shape of the grill when in its rolled up second condition is shown in FIG. 6. The movement of the bars with respect to each other as the transition of the grill from first condition toward the second condition takes place is suggested in FIG. 5. Starting at the right end as seen in FIG. 5, as the bars are rolled together, the shanks move from their straight horizontal relationship with respect to each other (see left end portion of FIG. 5) toward a right angular relationship between adjacent shanks. See the mutual relationship of the shanks 18 of the last two bars 12 to the right in FIG. 5.

In a preferred embodiment of the invention, table legs 48 are each pivotally mounted on one of the four corners of the table or grill 10. These legs are very similar in shape to well known aluminum tent pegs except that the very top portions are crimped down on provided hinge straps 50. The cross sectional shape of lower portions of legs 48 is seen in FIG. 7. Top ends of each leg 48 are pivoted to the hinge strap 50 through the instrumentally of nuts and bolts 52. As best seen in FIGS. 2, 3 and 4, each hinge strap 50 is fixedly positioned with respect to the rods of two end bars 12 through the instrumentally of a clamping plate 54 and nuts and bolts 56.

The slightly splayed position of these legs when the grill is in open first condition for use is seen in FIG. 1. When the grill is to be put into its rolled up second condition, legs 48 are rotated into adjacent, parallel relation to the rods of the two end bars, the grill inverted and rolled to its second condition as seen in FIG. 6.

Even with the legs in place, in the form of the invention as shown herein, the grill in its second condition can easily be enclosed within a solid cylinder or a storage bag having an inside diameter of less than one fifth of the length of the grill in open first condition measured from leading end 32 to trailing end 34.

In many situations where it is possible to position the grill on existing outdoor fireplaces or the like, some or all of the table legs 48 may be unnecessary. The unneeded leg or legs can be positioned in parallel relation to the rods 14 in those cases. Also, grills of the present invention without any legs can be used by supporting them horizontally in a first condition on stones, bricks, sod or across trenches in which charcoal or wood fires have been built.

Although the present invention has been described with reference to preferred embodiments, workers skilled in the art will recognize that changes may be made in form and detail without departing from the spirit and scope of the invention. The specific embodiments described are given by way of example only and the invention is limited only by the terms of the appended claims.

What is claimed is:

1. A roll-up portable table presenting, when in an open first condition for use, a relatively flat, substantially rectangular, upwardly facing cooking table adapted to be supported to define a generally horizontal rigid surface; and when in a rolled up second condition for transport or storage, configured to be circumscribed by a generally cylindrical container:
   a. said table includes a plurality of bars, each bar having:
      (1) a straight, stiff, longitudinally extending central rod spaced from and mutually parallel with respect to every other central rod, and
      (2) two generally J-shape hook portions, one at each end of that rod;
   b. the J-shape hook portions of each bar each include a shank, a first end of which extends integrally from one end of the rod and each include a hook which extends integrally from a second end of the shank;
   c. the shanks of the hook portions of each bar extend away from the rod in generally congruent relation to each other while converging slightly toward each other;
   d. the hooks of the J-shape hook portions of each bar extend from integral connection with their shanks diametrically away from each other and in concentric alinement with each other to lie in parallel, spaced relation to the rod of that bar; and
   e. the bars are assembled so as to have each shank of each leading bar extend underneath the rod of the next adjacent trailing bar and the hooks of that leading bar extend outwardly over and above the shanks of the trailing bar when the table is in its open first condition.

2. The table of claim 1 wherein:
   a. the longitudinal distance between the outermost side edge surfaces of the first shank ends of each bar adjacent their integral connection to their rod defines a first major longitudinal dimension of that bar;
   b. the longitudinal distance between the outermost side end surfaces of the hooks of each bar defines a second major longitudinal dimension of that bar; and
   c. the second major longitudinal dimension is greater than, equal to, or not substantially less than, the first major longitudinal dimension.

3. The table of claim 2 wherein each of the J-shape hook portions and at least the ends of the rods immediately adjacent to these portions are made of stiff, elongate material of a predetermined uniform thickness.

4. The table of claim 3 wherein said elongate material is circular in transverse cross section.

5. The table of claim 4 wherein said elongate material has the heat resistant properties of stainless steel.

6. The table of claim 3 wherein from their outermost side edge surfaces, each shank of each bar converges inwardly toward a center line of the table between the rod and the hook by approximately twice the cross sectional dimension of that elongate material, and the leading edge surface of the hook open to the outer side edge surface of that shank extends in parallel relation to its rod for approximately twice the cross sectional dimension of that material.

7. The table of claim 6 wherein the upper surface of each shank, as viewed when the table is in its horizontal first condition, is concave downwardly between its rod and hook to a depth of approximately the cross sectional dimension of the elongate material to the end that the hook of the leading bar and the rod of the trailing bar will lie in the flat plane table surface when the grill is in open first condition.

8. The table of claim 7 wherein said elongate material is circular in transverse cross section.

9. The table of claim 8 wherein said elongate material has the heat resistant properties of stainless steel.

10. A roll-up cooking grill presenting, when in an open first condition for use, a relatively flat, substantially rectangular, upwardly facing cooking table adapted to be supported to define a generally horizontal rigid cooking surface; and when in a rolled up second condition for transport or storage, configured to be circumscribed by a generally cylindrical container:
   a. said grill includes a plurality of bars, each bar having:
      (1) a straight, relatively stiff, somewhat flexible, longitudinally extending central rod spaced from and mutually parallel with respect to every other central rod, and
      (2) two generally J-shape hook portions, one at each end of that rod;
   b. the J-shape hook portions of each bar each include a shank, a first end of which extends integrally from one end of the rod and each include a hook which extends integrally from a second end of the shank;
   c. the shanks of the hook portions of each bar extend away from the rod in generally congruent relation to each other while converging slightly toward each other;
   d. the hooks of J-shape hook portions of each bar extend from integral connection with their shanks diametrically away from each other and in concentric alinement with each other to lie in parallel, spaced relation to the rod of that bar;

e. the bars are assembled so as to have each shank of each leading bar extend underneath the rod of the next adjacent trailing bar and the hooks of that leading bar extend outwardly over and above the shanks of the trailing bar when the grill is in open first condition;

f. the longitudinal distance between the outermost side edge surfaces of the first shank ends of each bar adjacent their integral connection to their rod defines a first major longitudinal dimension of that bar;

g. the longitudinal distance between the outermost side end surfaces of the hooks of each bar defines a second major longitudinal dimension of that bar;

h. the second major longitudinal dimension is greater than, equal to, or not substantially less than the first major longitudinal dimension;

i. all of the J-shape hook portions and rods are made of relatively stiff, somewhat flexible, cylindrical wire of uniform thickness;

j. from their outermost side edge surfaces, each shank of each bar converges inwardly toward a center line of the grill between the rod and the hook by approximately twice the cross sectional diameter of the wire, and the leading edge surface of the hook open to the outer edge surface of that shank extends in parallel relation to its rod for approximately twice the diameter of the wire; and k. the upper surface of each shank, as viewed when the grill is in its horizontal first condition, is concave downwardly between its rod and hook to a depth of approximately the diameter of the wire to the end that the hook of the leading bar and the rod of the trailing bar will lie in the flat plane cooking surface when the grill is in open condition.

11. A roll-up cooking grill presenting, when in an open first condition for use, a relatively flat, substantially rectangular, upwardly facing cooking table adapted to be supported to define a generally horizontal rigid cooking surface; and when in a rolled up second condition for transport or storage, configured to be circumscribed by a generally cylindrical container:

a. said grill includes a plurality of bars, each bar having:
(1) a straight, relatively stiff, longitudinally extending central rod spaced from and mutually parallel with respect to every other central rod, and
(2) two generally J-shape hook portions, one at each end of that rod;

b. the J-shape hook portions of each bar each include a shank, a first end of which extends integrally from one end of the rod and each include a hook which extends integrally from a second end of the shank;

c. the shanks of the hook portions of each bar extend away from the rod in generally congruent relation to each other while converging slightly toward each other;

d. the hooks of J-shape hook portions of each bar extend from integral connection with their shanks diametrically away from each other and in concentric alinement with each other to lie in parallel, spaced relation to the rod of that bar; and e. the bars are assembled so as to have each shank of each leading bar extend underneath the rod of the next adjacent trailing bar and the hooks of that leading bar extend outwardly over and above the shanks of the trailing bar when the grill is in open first position.

12. The grill of claim 11 wherein:

a. the longitudinal distance between the outermost side edge surfaces of the first shank ends of each bar adjacent their integral connection to their rod defines a first major longitudinal dimension of that bar;

b. the longitudinal distance between the outermost side end surfaces of the hooks of each bar defines a second major longitudinal dimension of that bar; and c. the second major longitudinal dimension is greater than, equal to, or not substantially less than the first major longitudinal dimension.

13. The grill of claim 12 wherein each of the J-shape hook portions and at least the ends of the rods immediately adjacent to these portions are made of stiff, elongate material of a predetermined uniform thickness.

14. The grill of claim 13 wherein said elongate material is circular in transverse cross section.

15. The grill of claim 14 wherein said elongate material has the heat resistant properties of stainless steel.

16. The grill of claim 13 wherein from their outermost side edge surfaces, each shank of each bar converges inwardly toward a center line of the grill between the rod and the hook by approximately twice the cross sectional dimension of that elongate material, and the leading edge surface of the hook open to the outer side edge surface of that shank extends in parallel relation to its rod for approximately twice the cross sectional dimension of that material.

17. The grill of claim 16 wherein the upper surface of each shank, as viewed when the grill is in its horizontal first condition, is concave downwardly between its rod and hook to a depth of approximately the cross sectional dimension of the elongate material to the end that the hook of the leading bar and the rod of the trailing bar will lie in the flat plane cooking surface when the grill is in open condition.

18. The grill of claim 17 wherein said elongate material is circular in transverse cross section.

19. The grill of claim 18 wherein said elongate material has the heat resistant properties of stainless steel.

* * * * *